R. REIN.
CALCULATING MACHINE.
APPLICATION FILED MAR. 29, 1909.
938,790.
Patented Nov. 2, 1909.
2 SHEETS—SHEET 2.
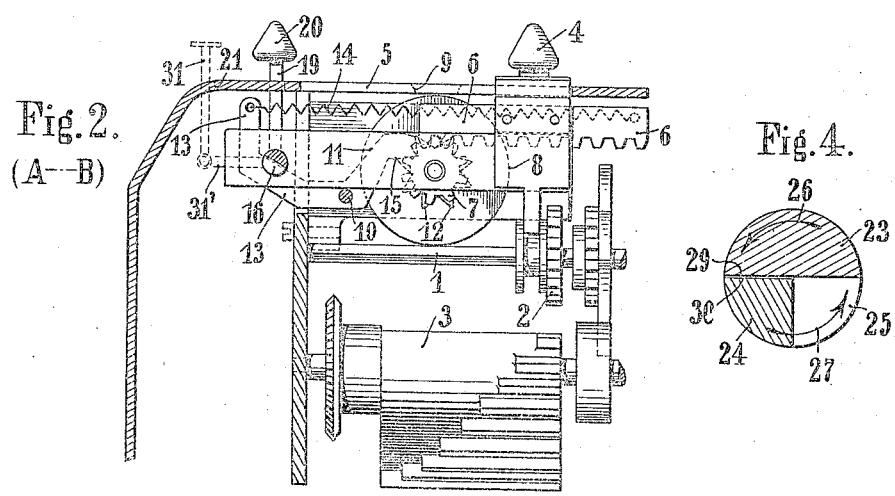
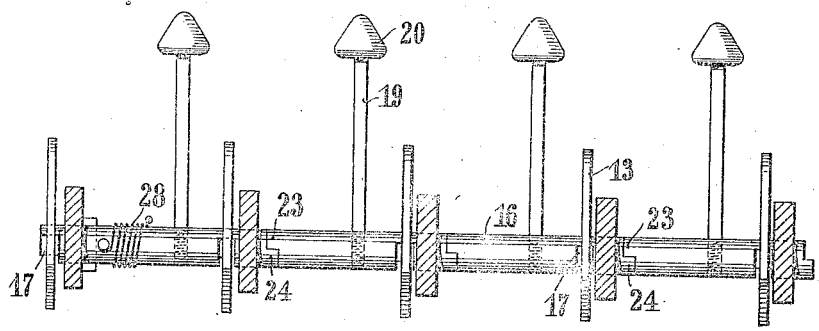
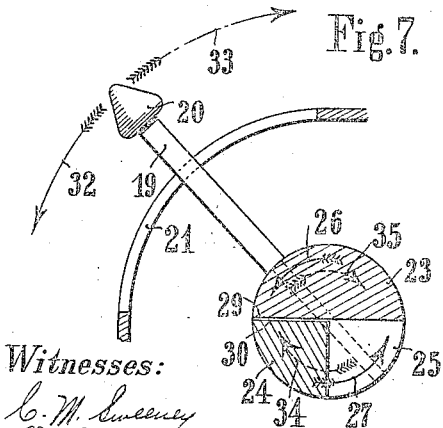
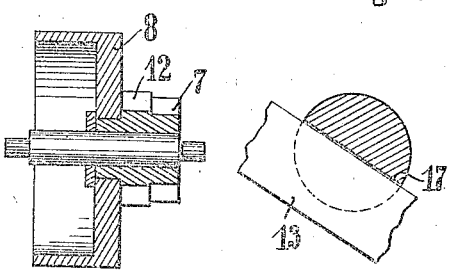
Witnesses:
Inventor:
Robert Rein

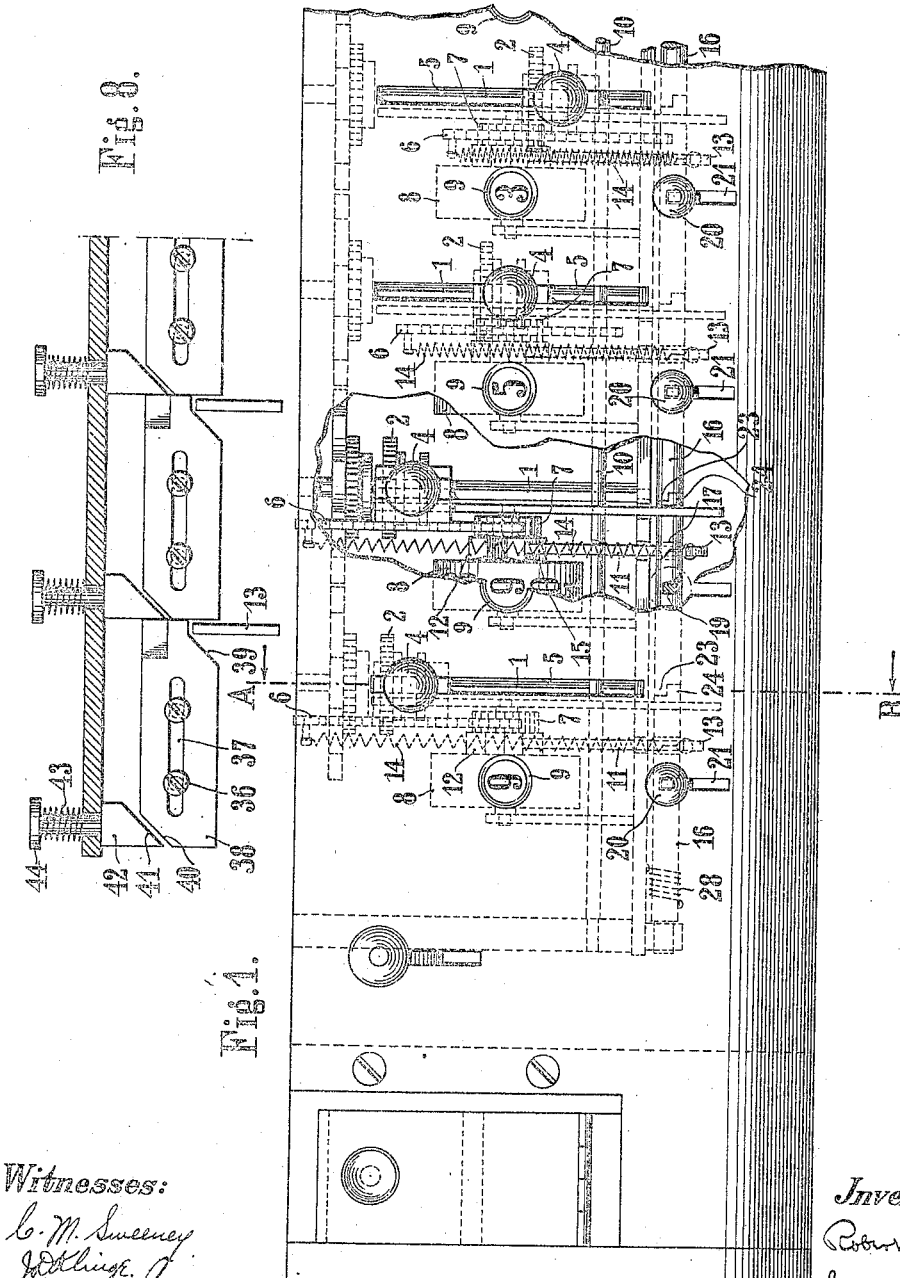

UNITED STATES PATENT OFFICE.

ROBERT REIN, OF BERLIN, GERMANY.

CALCULATING-MACHINE.

938,790.    Specification of Letters Patent.    Patented Nov. 2, 1909.

Application filed March 29, 1909. Serial No. 486,412.

*To all whom it may concern:*

Be it known that I, ROBERT REIN, a subject of the Emperor of Germany, and resident of Berlin, Germany, have invented a certain new and useful Improvement in Calculating-Machines, of which the following is a specification.

This invention relates to calculating machines of the type shown and described in the British patent to Charles Xavier Thomas de Colmar, No. 13,504, February 10, 1851, and in the British patent to Ludwig Spitz, No. 26,296, November 20, 1906, to which patents reference may be had for a more complete exposition of features not herein fully shown and described.

The essential features of machines of this general type are, briefly, as follows:—The machine includes a plurality of axially parallel cylinders, known in the art as "feed drums", each of which is provided peripherally with a series (usually nine) of parallel, longitudinal ribs or elongated gear teeth, which are unequal in length and arranged in a step-like manner progressively according to their relative lengths. Means are provided for simultaneously rotating all of said feed drums through one complete rotation or through so much thereof as will cause all of the gear teeth of each drum to pass a given point. The machine also includes suitable registering mechanism comprising a plurality of indicators (usually in the form of recorder wheels), equal in number to the number of feed drums, and connected by suitable transfer mechanism which may be of any usual or well known form. Mechanism is provided for actuating the registering mechanism, this mechanism including the following instrumentalities:—Arranged parallel and adjacent to each of the feed-drums is a rotatable shaft, each of said shafts being connected by suitable transmission mechanism with one of said indicators. Mounted on each of said shafts for rotation therewith, but free to be moved longitudinally thereof, is a gear wheel having teeth adapted to mesh with the gear teeth on the adjacent feed drum. These gear wheels, from their coöperative relationship with the feed drums are conveniently designated "feed wheels". The relative arrangement of the feed drums and feed wheels is such that each feed wheel may be moved from a position out of reach of any of the teeth on the adjacent feed drum, known as the "zero position", longitudinally of the feed drum into a position to be engaged by any predetermined number of the teeth on the drum when said drum is rotated. The above mentioned transmission mechanism is so proportioned that each of said indicators will be moved a number of points corresponding to the number of teeth through which its connected feed wheel is turned. For adjusting or setting the feed wheels there is usually provided a series of setting slides operating in a series of slots arranged from left to right in a setting plate, each of said slots having arranged adjacent thereto a scale of figures from 0 to 9.

To avoid the necessity of manually setting each feed wheel to zero, in machines of this type, zero adjusting devices have been constructed which permit the feed wheels to be positively returned to their zero position by operation of a single handle.

Now, the object of the present invention is to provide a zero adjusting device, which, besides permitting the setting of all the feed wheels to zero by one hand-movement, will also permit the simultaneous setting to zero of any desired number of feed wheels (counted from right to left, say). As the resulting advantage it follows that with repeated calculations it is not necessary to reset to zero also those feed wheels which are already in the required position.

In accordance with the invention each feed wheel with its setting slide is acted upon by a spring tending to return it to the zero position and is at the same time controlled by a locking gear which is acted upon by the same spring and prevents the return of the wheel until the gear is released by hand.

The release of the locking gear of any feed wheel is independent of the release of the locking gear of the preceding feed wheels, while at the same time the following wheels are released so that any number of wheels counted from left to right may be simultaneously returned to zero position.

Any desired number of wheels may be simultaneously reset to zero irrespective of their position relatively to the other wheels if a second releasing gear for the feed wheels is arranged symmetrically to the first in such wise that with said second gear the release of each feed wheel is independent of the release of the wheels to its left (*i. e.*, the following wheels) but is dependent on the release of the wheels to its right (i. e., the preceding wheels).

The invention is illustrated in the accompanying drawings in which—

Figure 1 is a plan of the machine. Fig. 2 is a section on the line A—B of Fig. 1. Fig. 3 shows the connections between the locking gears of the feed wheels on an enlarged scale, while Figs. 4, 5 and 6 show details also on enlarged scale. Fig. 7 shows a modified construction of the releasing gear wherein the lever is adapted to be moved in two directions. Fig. 8 shows a modified construction of the releasing gear for the feed wheels, comprising slides disposed one behind the other.

The feed wheel 2 which is as usual slidably mounted on the prismatic shaft 1 and engages with the feed drum 3 according to its position, is adapted to be moved on said shaft by a setting knob 4 guided within the slot 5 provided in the frame.

In order to effect an exact adjustment in accordance with the graduated teeth of the feed drum the setting knob 4 is rigidly connected with a toothed rack 6 engaging with a pinion 7 on the shaft of which is mounted the recorder wheel 8 provided with numerals 1 to 9. The recorded numeral for the time being is visible through a window 9. A pawl 11 pivoted on a rod 10 within the frame of the machine engages with a ratchet wheel 12 (Figs. 2 and 5) keyed on the pinion shaft adjacent to the pinion 7 or formed in one piece with the latter. The pawl is held in engagement with the ratchet wheel 12 by a spring 14 connected at one end to the arm 13 of the pawl and at the other end connected to the rack 6, so that each time the pinion 7 is turned through one tooth, the pawl is raised and comes into engagement with the next tooth.

Owing to the symmetrical formation of the pawl face 15 it is possible to move the rack 6 in both directions (forward and backward) notwithstanding which a reliable locking effect is obtained, as the pawl is directly acted upon by the spring 14.

It is clear that after the pawl 11 is released from its ratchet wheel 12, the rack 6, the setting knob 4, and the feed wheel 2 are returned to zero position under the action of the spring 14. In order to effect the release of the pawls 11 in such manner that by a single movement of the hand either all or any desired number of the pawls 11 counted from left to right may be disengaged, the mechanism described below is provided.

Separate shaft sections 16 are rotatably mounted within the frame of the machine and are provided with recesses 17 (Figs. 3 and 6) engaged by the arms 13 of the pawls 11 under the action of the springs 14. If one of the sections 16 is rotated, the corresponding arm 13 of a pawl 11, is depressed, whereby the pawl is turned around its pivot 10 and disengaged from its ratchet wheel 12, so that the corresponding feed wheel 2 is returned to zero position. To permit the rotation of the shaft sections 16 each of them is provided with a lever 19 having a knob 20, which lever passes through a slot 21 in the frame and can be moved through a definite angle.

Instead of the lever 19 a key 31 may be arranged as shown in dotted lines so that by vertical depression of the same the shaft section 16 connected to said key by a lever $31^1$ is rotated.

The shaft sections are arranged so that when any portion is rotated the following section is also rotated, while the preceding ones remain stationary. For this purpose, the shaft sections 16 are provided at their ends with claws adapted to engage with the claws of the adjacent sections so that an angular clearance 25 (Fig. 4) is left between the claws 23 of the preceding shaft section and the claw 24 of the following shaft section in such manner that when the preceding shaft section 16 is rotated in the direction of the arrow 26 (Fig. 4) the following shaft section 16 is also rotated, while, when a following section is rotated in the direction of the arrow 27 the preceding shaft section remains stationary. A spring 28 (Fig. 3) on the last shaft section insures that the edges 29 and 30 of the claws are kept continuously in engagement.

With the arrangement described, the movement of one of the levers 19 and consequent rotation of the shaft section, effects the rotation of all the following sections whereby all the following pawls are disengaged and the feed wheels returned to zero position under the tension of the spring 14, while all the preceding wheels remain stationary. If, for instance, the three feed wheels at the left end are to be set to zero and the others are to remain in position, the third knob 20 from the extreme left must be actuated; and so on. If, however, all the feed wheels are to be returned simultaneously to zero, the first knob on the right is to be operated.

It will be seen that slides with inclined faces disposed behind each other may serve in lieu of the engaging shaft sections 16, to effect the release of the pawls 11, in such wise that when one slide is moved all the slides on the left hand side thereof are also moved while those at the right remain stationary, each slide so moved effecting the release of a pawl.

In the construction shown in Fig. 8 the arms 13 of the pawls are depressed by contact with suitably beveled ends 39 of the horizontally movable slides 38, thus effecting the release of the pawls. The slides are provided with slots 37 which are engaged by pins 36 serving as guides. The movement of these slides is effected by depression of the buttons 44 having wedges 42 which buttons are arranged in the cover of the machine and are normally supported by the springs 43, the beveled faces 41 of which wedges are adapted to engage correspondingly beveled faces 40 of the slides 38, so that the latter are moved laterally.

In the arrangement shown, by the depression of a button all the slides on the right hand side of the latter are operated, while those on the left hand side remain inoperative.

With the use of a second releasing gear for the pawls 11 symmetrically to the first, which second gear may consist of shaft sections engaging each other in a manner opposite to that in which the shaft sections 16 are engaged (Fig. 3), any desired number of feed wheels may be returned to zero position, irrespective of their relative position in the machine, by operating both releasing gears simultaneously by means of two knobs.

As the construction is complicated by duplicating the releasing gear for the pawls, the arrangement shown in Fig. 7 may be applied. In this arrangement a single releasing gear such as shown in Figs. 1 to 3 is provided; the levers 19, however, with their knobs 20 by which the releasing gear is actuated, may be moved not only in one direction (arrow 26, Fig. 4) but also in the reverse direction (arrow 33, Fig. 7). When the releasing gear is at rest, the levers 19 are normally inclined to the horizontal at an angle of approximately 45° and may be moved either upward in the direction of the arrow 33 or downward as indicated by the arrow 32. If the lever is moved as shown by the arrow 32, the release is effected as before described in such manner that all the following shaft sections on the left hand side are actuated, but all preceding portions remain stationary. However, if the lever 19 is moved in the direction of the arrows 33, 34 and 35, then all the preceding shaft sections are operated, while all the following sections remain inoperative. This will be clear by reference to Fig. 3, when it is considered that the left ends of the shafts are provided with the claws 23, whereas the right ends are provided with the claws 24. The levers 19 being thus adapted to be moved in two directions according to the arrows 32 and 33 permit a resetting to zero with one manual operation of all the feed wheels either on the left hand side of the knob or of all the wheels to the right hand side thereof. Further, it is impossible by operating two knobs, to return all the feed wheels at either side of the knob to zero position while leaving those between the two knobs at rest.

Having described my invention what I claim and desire to secure by Letters Patent of the United States is:—

1. In a calculating machine, the combination with the feed wheels of means for resetting said feed wheels to zero, devices for locking said wheels, and means operable to release at one actuation certain predetermined locking devices only.

2. In a calculating machine, the combination with the feed wheels of means for resetting said feed wheels to zero, devices for locking said wheels, movable members operable to release said locking devices, said movable members adapted to be operatively connected so that succeeding members are movable together but independently of preceding members, and manually operable means for moving any of said members to release corresponding locking devices.

3. In a calculating machine, the combination with the feed wheels of means for resetting said feed wheels to zero, devices for locking said wheels, two sets of movable members, the movable members of each set adapted to be operatively connected so that succeeding members of the set are movable together but independently of preceding members of the set, and manually operable means for moving any two of said members to release selected locking devices.

In testimony whereof I have signed my name to this specification in the presence of two subscribing witnesses.

ROBERT REIN.

Witnesses:
  HENRY HASPER,
  WOLDEMAR HAUPT.